(No Model.)
J. WEBER.
LATHE.
No. 579,620.
Patented Mar. 30, 1897.
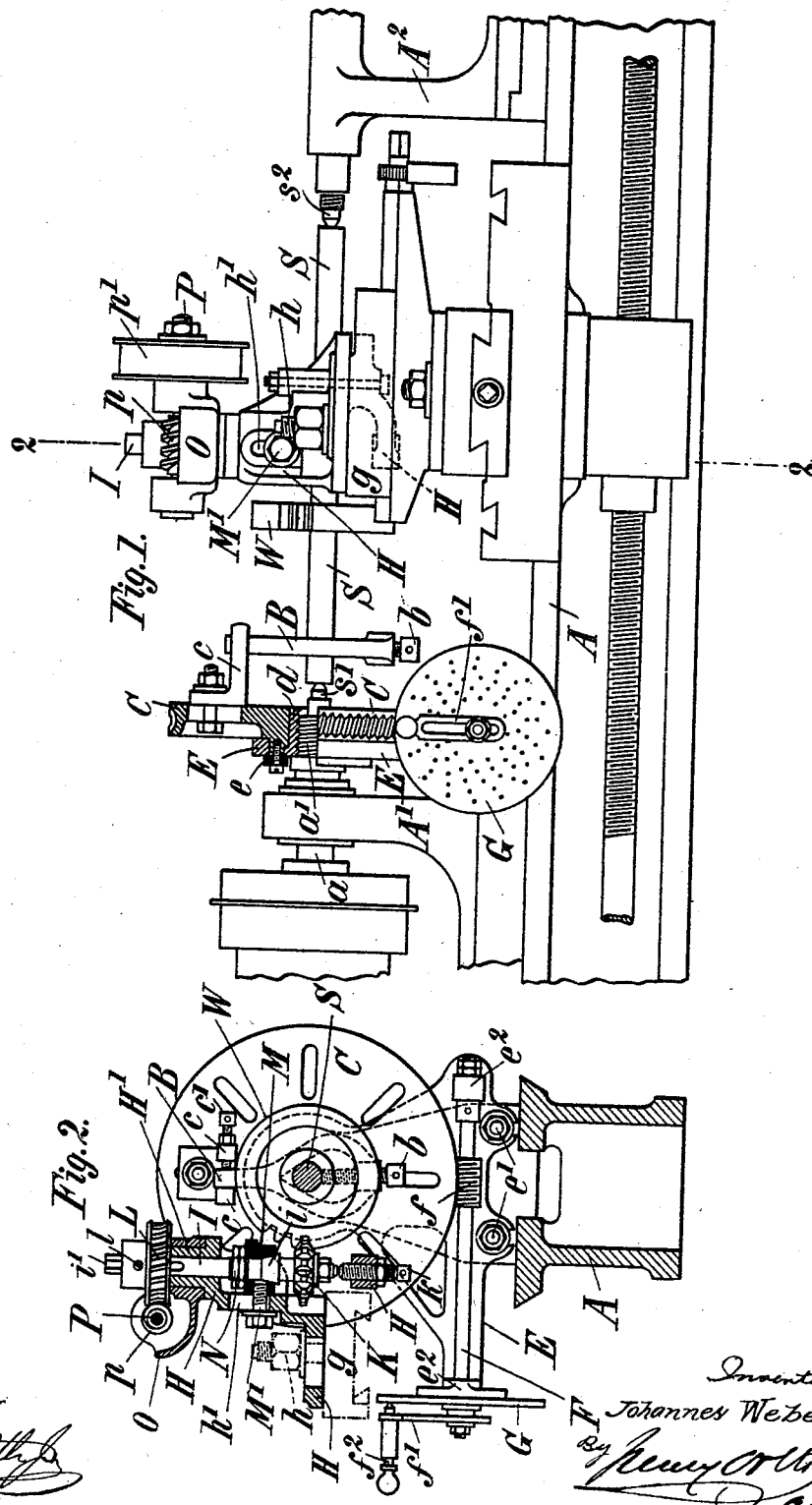

UNITED STATES PATENT OFFICE.

JOHANNES WEBER, OF REUTLINGEN, GERMANY.

LATHE.

SPECIFICATION forming part of Letters Patent No. 579,620, dated March 30, 1897.

Application filed August 13, 1896. Serial No. 602,688. (No model.) Patented in Germany July 19, 1892, No. 67,783, and in England May 4, 1893, No. 8,943.

*To all whom it may concern:*

Be it known that I, JOHANNES WEBER, a subject of the German Emperor, and a resident of Reutlingen, in the Kingdom of Würtemberg, German Empire, have invented certain new and useful Improvements in Lathes, (for which I have obtained a patent in Germany, No. 67,783, dated July 19, 1892, and in Great Britain, No. 8,943, dated May 4, 1893,) of which the following is a specification.

My invention relates to an improved lathe attachment for dividing and milling and adapted for use on an ordinary lathe.

The dividing apparatus consists, essentially, of a worm-wheel mounted loosely on a socket adapted to be screwed onto the threaded end of the spindle of the head-stock and carrying jaws adapted to engage with the dog or tappet fixed to the spindle carrying the wheel to be cut, of a plate or frame loosely mounted on the boss of the worm-wheel and fixed to the head-stock in a suitable manner, of a worm mounted in suitable bearings carried by the plate or frame and gearing with the worm-wheel, and of a dividing-plate attached to the bracket in which the spindle carrying the worm is journaled. The milling apparatus, which is adapted to be fixed onto the main slide-rest, consists of a frame having suitable bearings to carry a vertical spindle for carrying the cutter and a horizontal spindle for carrying the driving-pulley, the two spindles being geared together by a worm and worm-wheel, the bearing carrying the worm being adjustably mounted on the frame carrying the cutter-spindle, so that the pulley driving it may be placed in any position to receive the driving power notwithstanding the position in which the cutter may be placed. I attain this end in the manner shown by the accompanying drawings, in which—

Figure 1 is a side elevation, partly in section, of a part of a lathe provided with my improved dividing and milling apparatus. Fig. 2 is a cross-section on the line 2 2, Fig. 1.

Throughout the views similar parts are marked with like letters of reference.

Referring to the drawings, in which the milling device or the cutter, respectively, is shown as sidewise removed from the work-piece, A designates the bed, A' the head-stock, and $A^2$ the sliding puppet, of the lathe. The mandrel S, carrying the work-piece W to be operated, is placed between the centers $s'$ and $s^2$ of the lathe in well-known manner and provided at one end with a suitable dog or tappet of any well-known form. In the figures I have shown a heart-shaped dog B clamped upon the mandrel S by means of a set-screw $b$.

The dividing device consists of a worm-wheel C, which is mounted loosely, so as to be free to rotate, on a socket $d$, screwed upon the threaded end $a'$ of the head-stock spindle $a$. The worm-wheel C carries the driver, formed of two lugs $c$, adapted to engage with the dog B, to which it may be secured by means of a set-screw $c'$. On the boss of the worm-wheel C is loosely mounted, by means of a guide-ring $e$, a bracket E, fixed, for instance, by means of bolts $e'$ to the head-stock A' to prevent it rotating. This bracket carries suitable bearings $e^2$, in which is journaled a spindle F, having cut in or mounted on it a worm $f$, which gears with the worm-wheel C. G designates the dividing-plate, which is attached to the bracket E and is of the ordinary type, and $f'$ a crank-arm with locking-pin $f^2$ for operating the spindle F. By means of this crank-arm $f'$ and the dividing-plate G the worm $f$ and worm-wheel C, and accordingly the mandrel S and the work-piece W, may be rotated and the dividing operations effected in well-known manner. As the worm-wheel C is loosely mounted on the spindle $a\ a'$, the said worm-wheel will not be influenced by the latter when the lathe is running in order to be used as an ordinary lathe.

The milling device is carried by the main slide-rest, so that the former or the cutter of it, respectively, may be brought in any position to the work-piece W. For this purpose the frame H of the milling device is fixed to the sliding support $g$ by the stud or pivot bolt $h$. The frame H is provided with suitable bearings for the movably-journaled vertical spindle I, carrying the cutter K and the worm-wheel L. The said spindle I is supported by a center-screw $k$, by means of which the spindle may be lifted or lowered in the direction of its axis, in order to adjust the position or height of the cutter K accordingly. For enabling the vertical adjustment of the cutter-spindle the worm-wheel L, which is adapted to rotate the cutter-spindle, is movably fixed on the same by means of a screw-pin $l$, engaging a groove $i'$ of the spindle. For the same reason the bearing-block M, in which the cutter-spindle is journaled by means of a conical shoulder $i$ and suitable nuts N, is adjustably fixed to the frame H by means of a set-screw M', sliding in a slot $h'$ of the frame H.

The bracket O, carrying the bearings for the horizontal shaft P, on which is mounted a worm $p$, gearing with the worm-wheel L on the vertical spindle I, is mounted on a sleeve H', forming part of the frame H, so that the said bracket O is capable of being moved around the axis of the cutter-spindle in order to set the driving-shaft P parallel to the axis of the lathe, whatever the position of the frame H or the cutter K, respectively, with respect to the work-piece may be. $p'$ designates the driving-pulley on shaft P.

The hereinbefore-described lathe attachment is suitable for cutting spur, bevel, cog, and other gear-wheels of any size and thickness as far as the height of centers and distance between centers of the lathe will admit, and it may also be used for making or recutting rimmers, taps, key-beds, grooved rolls, tools, machine parts, and the like.

The apparatus is self-acting where there is a guide-screw to the lathe.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

Having fully described my invention, what I desire to claim and secure by Letters Patent is—

1. In a lathe, the combination with the head-stock, and its spindle, and the work-support; of a worm-wheel loosely mounted on the head-stock spindle and adapted to engage the work-support, a spindle having bearings connected with the head-stock and carrying a worm in gear with said worm-wheel, a dividing-plate concentrically arranged relatively to the worm-spindle and the crank-arm $f'$ secured to said spindle, for the purpose set forth.

2. In a lathe, a dividing attachment comprising a worm-wheel adapted to be mounted so as to revolve freely on the head-stock spindle and provided with lugs $c\ c$, a supporting-frame adapted to be secured to the head-stock and provided with a bearing for said worm-wheel, a spindle having its bearings in said supporting-frame and carrying a worm in gear with the worm-wheel, a dividing-plate secured to said frame concentric with the worm-spindle and a crank-arm $f'$ secured to said spindle, substantially as and for the purpose set forth.

3. In a lathe, the combination with the head-stock and its spindle, of a worm-wheel loose on said spindle and adapted to engage the work-carrying mandrel, a worm in gear with said wheel, a stationary dividing-plate concentric with the worm-spindle, and means for setting the worm-wheel by said dividing-plate, of an endwise-adjustable cutter-spindle, a worm-gear for said spindle, said gear adjustable relatively thereto, and the slide-rest to which said parts are connected, substantially as and for the purpose set forth.

In testimony that I claim the foregoing as my invention I have signed my name, in presence of two witnesses, this 29th day of July, 1896.

JOHANNES WEBER.

Witnesses:
CARL SCHLEICHER,
CHRISTIAN BAUER.